CROSS REFERENCE

United States Patent Office 3,012,405
Patented Dec. 12, 1961

---

3,012,405
METHOD AND COMPOSITION FOR STRENGTHENING LOOSE GROUNDS
Claude Caron, Paris, France, assignor to Societe dite: Soletanche (S.A.R.L.), Paris, France, a corporation of France
No Drawing. Filed Jan. 12, 1959, Ser. No. 786,020
Claims priority, application France Jan. 18, 1957
6 Claims. (Cl. 61—36)

My invention is in part a continuation of my copending application Ser. No. 671,698, filed on July 15, 1957, now abandoned. It has for its object a method for strengthening loose grounds in particular for the consolidation of sandy masses and soils so as to allow the execution in such grounds of foundations, excavations, well sinkings and the like, without any risk of any collapsing of the ground which would be dangerous for the workmen and be detrimental to the execution of the works.

Hitherto, one of the methods which was the most commonly applied for this purpose consisted in injecting into the ground an alkaline silicate to which was added a jellifying reagent with a view to transforming the soluble silicate into a stable and water-insoluble silica gel.

This result may be achieved in accordance with two different methods, i.e. either through injection of said jellifying reagent after the injection of the silicate, which means a two-stage operation or else through injection of said reagent together with the silicate, which means a single-stage operation.

In the case of successive injections, there is no risk of clogging the channels, since the reaction is not produced inside said channels, which allows resorting to concentrated solutions of the silicate and of the reagent so as to feed the ground with a product having a high specific weight, which bestows a considerable resistance to said ground. However, this method shows certain drawbacks and it requires in particular the provision of wells which are very near each other and also the application of high injection pressures.

In the second case, i.e. when the two products are injected simultaneously, it is necessary to ensure a delayed reaction between said products, so that said reaction may not be initiated as long as the mixture is in the mixer or in the channels. It is therefore possible to use only diluted solutions of silicate and of reagent. The operation is more convenient than in the preceding case, since the pressures applied are lower and the wells are provided at a greater distance from one another. The application of this method is therefore less expensive but the resistance bestowed to the ground is less considerable than when a two-stage operation is resorted to.

The present invention allows removing the drawbacks of both above-disclosed methods, while retaining their advantages.

The invention consists in ensuring the jellification through reaction between an alkaline silicate such as sodium silicate and a product which is not soluble in said silicate, but is capable of reacting with the latter. Thus, the alkaline silicate or its solution is transformed almost entirely into silica gel.

In such a case, the duration of setting depends essentially on the duration of reaction between the silicate and the product incorporated therewith, instead of depending, as in the preceding examples, on the extent of dilution of the material resorted to.

However, in order that the reaction may be executed under favorable conditions, i.e. with a view to furthering the formation of a stable emulsion, it is of advantage to incorporate with the mixture formed by the silicate and the reagent, a tensio-active product, such as isopropyl formate, the product sold under the registered tradename Teepol, which is a detergent mixture of the sodium salts of sulfated fatty alcohols consisting of about 15% mixed $C_8$ and $C_{10}$ (octyl and decyl) alcohols, 40% $C_{12}$ (lauryl or dodecyl) alcohols, 30% $C_{14}$ (myristyl or tetradecyl) alcohol and 15% mixed $C_{16}$ and $C_{18}$ (cetyl, stearyl and oleyl) alcohols, or the like products.

In order to insolubilize silica, I resort advantageously to any organic body adapted to show an acid function upon reaction such, for instance, as esters or else to products derived from ammonia through the substitution for the hydrogen atom of a carbon-containing radical (amine or imine or an acid radical such as an amide, etc.). Among these substances, one of those which is the most advantageous for use is constituted by ethyl acetate which may be added to the silicate in proportions ranging between 5 and 20%. I may also use for this purpose ethyl oxalate, propyl formate, ethyl silicate, ethyl halogenides, etc.

The silicate resorted to is any alkaline silicate but, in practice, sodium silicate is used.

In order to make the conditions of application of my invention more readily understandable, I will now give, by way of example and by no means in a limiting sense, the composition of a number of mixtures which have provided excellent results in practice:

Example 1

| | Litres |
|---|---|
| Sodium silicate at 36/38° Bé | 100 |
| Ethyl acetate | 10 |
| Teepol | 0.5 |

Said mixture is used in sand formations having a permeability of $10^{-4}$ m./sec. (which indication corresponds to the speed of progression of water through sand) and it has allowed in practice executing in such formations a gallery having a diameter of 3 meters and a length of about 10 meters, twenty-four hours after the injection of said mixture.

Example 2

A mixture which is but slightly different from the preceding mixture comprises:

| | Litres |
|---|---|
| Sodium silicate | 99 |
| Ethyl acetate | 10 |
| Teepol | 1 |

Said mixture is jellified at the end of fifty minutes and shows at the end of twenty-four hours a resistance of about 20 kg. per sq. cm.

Example 3

The following mixture when used in slightly finer sand formations has allowed digging therein a well 30 meters deep with a diameter of 5 meters.

| | Litres |
|---|---|
| Sodium silicate | 100 |
| Ethyl acetate | 10 |
| Teepol | 0.25 |
| Isopropyl formate | 0.25 |

Example 4

In this fourth example, the mixture has the following composition:

| | Litres |
|---|---|
| Sodium silicate 36–38° Bé | 100 |
| Ethyl acetate | 7 |
| Isopropyl formate | 0.25 |

During the different tests executed with said mixture, it has been possible to vary the amounts of ethyl acetate between 6 and 8 litres, i.e. 6 and 8% of the amount of sodium silicate by volume and the amount of isopropyl formate between 0.2 and 1 litre, i.e. 0.2 and 1% of the amount of sodium silicate by volume.

Said mixture has been used for the execution of the Paris Underground Railway in the sandy layers adjacent the city.

An increase of the proportion of isopropyl formate in particular above 0.3% leads to an acceleration of the setting, the speed of which is substantially proportional to the amount of said product incorporated with the silicate. Furthermore, this increases also the hardness of the ground into which the mixture has been injected.

Generally speaking, the proportion of ethyl acetate corresponds to 5 to 20% of the amount by volume of pure sodium silicate at 36° Bé. Underneath 5%, there is no setting at all and above 20%, no further increase is noticed as concerns the speed of setting or the hardness of the ground into which the product has been injected.

Results similar to those indicated above in Examples 1 to 4, inclusive, are obtained when the ethyl acetate employed in such examples is replaced by ethyl oxylate, propyl formate, ethyl silicate or ethyl chloride.

It is also possible to resort to metal powders and, in particular, to aluminium powder as a substitute reagent instead of ethyl acetate.

The gel obtained according to my improved method shows the following advantages:

The components required for its production may be injected simultaneously;

It enters the sand in a homogeneous manner;

Its duration of setting is sufficient for its application not to meet any difficulty;

Its duration of setting remains substantially constant for large modifications in the amounts of reagent used;

The gel thus formed shows together with a certain plasticity a considerable mechanical resistance.

Obviously, the invention is by no means limited to the above-described means and it covers all the modifications thereof falling within the scope of the accompanying claims.

What I claim is:

1. A method of solidifying loose soil consisting of simultaneously injecting into the soil sodium silicate, a reagent selected from the group consisting of ethyl acetate, ethyl oxalate, propyl formate, ethyl silicate and ethyl chloride, which reagent reacts with the soluble sodium silicate to transform the latter into a water-insoluble, stable silica gel, and a surface tension reducing agent selected from the group consisting of isopropyl formate and a detergent mixture of the sodium salts of sulfated fatty alcohols consisting of about 15% mixed $C_8$ and $C_{10}$ alcohols, 40% $C_{12}$ alcohol, 30% of $C_{14}$ alcohol and 15% mixed $C_{16}$ and $C_{18}$ alcohols, and operative to control the speed of the reaction between the sodium silicate and said reagent.

2. A method as in claim 1; wherein said reagent is present in an amount equal to 5 to 20%, by volume, of the amount of sodium silicate, and said surface tension reducing agent is present in an amount equal to 0.2 to 1%, by volume, of the amount of sodium silicate.

3. A method of solidifying loose soil consisting of injecting into the soil a mixture of sodium silicate, ethyl acetate in an amount between approximately 5 and 20%, by volume, of the amount of sodium silicate, and between approximately 0.2 and 1.0%, by volume, based on said sodium silicate, of a substance selected from isopropyl formate and a detergent mixture of the sodium salts of sulfated fatty alcohols consisting of about 15% mixed $C_8$ and $C_{10}$ alcohols, 40% $C_{12}$ alcohol, 30% of $C_{14}$ alcohol and 15% mixed $C_{16}$ and $C_{18}$ alcohols.

4. A composition for injection into loose soil for solidifying the latter; said composition consisting essentially of sodium silicate, a reagent selected from the group consisting of ethyl acetate, ethyl oxalate, propyl formate, ethyl silicate and ethyl chloride, which reagent reacts with the soluble sodium silicate to transform the latter into a water-insoluble, stable silica gel, and a surface tension reducing agent selected from the group consisting of isopropyl formate and a detergent mixture of the sodium salts of sulfated fatty alcohols consisting of about 15% mixed $C_8$ and $C_{10}$ alcohols, 40% $C_{12}$ alcohol, 30% of $C_{14}$ alcohol and 15% mixed $C_{16}$ and $C_{18}$ alcohols, and operative to control the speed of the reaction between the sodium silicate and said reagent.

5. A composition as in claim 4; wherein said reagent is present in an amount equal to approximately 5 to 20% of the volume of sodium silicate, and said surface tension reducing agent is present in an amount equal to approximately 0.2 to 1% of the volume of sodium silicate.

6. A composition for injection into loose soil to solidify the latter; said composition consisting essentially of sodium silicate, ethyl acetate in an amount between approximately 5 and 20%, by volume, of the amount of sodium silicate, and between approximately 0.2 and 1.0%, by volume, based on said sodium silicate, of a substance selected from isopropyl formate and a detergent mixture of the sodium salts of sulfated fatty alcohols consisting of about 15% mixed $C_8$ and $C_{10}$ alcohols, 40% $C_{12}$ alcohol, 30% of $C_{14}$ alcohol and 15% mixed $C_{16}$ and $C_{18}$ alcohols.

References Cited in the file of this patent

UNITED STATES PATENTS

| | | |
|---|---|---|
| 1,827,238 | Joosten | Oct. 13, 1931 |
| 2,045,153 | Lemmerman | June 23, 1936 |
| 2,330,145 | Reimers | Sept. 21, 1943 |
| 2,662,022 | Dietz | Dec. 8, 1953 |
| 2,766,130 | Dietz | Oct. 9, 1956 |

FOREIGN PATENTS

| | | |
|---|---|---|
| 411,908 | Great Britain | June 18, 1934 |
| 716,479 | Great Britain | Oct. 6, 1954 |